Feb. 12, 1946.   L. M. HAMMOND   2,394,686
VARIABLE CONDENSER
Filed Sept. 10, 1943
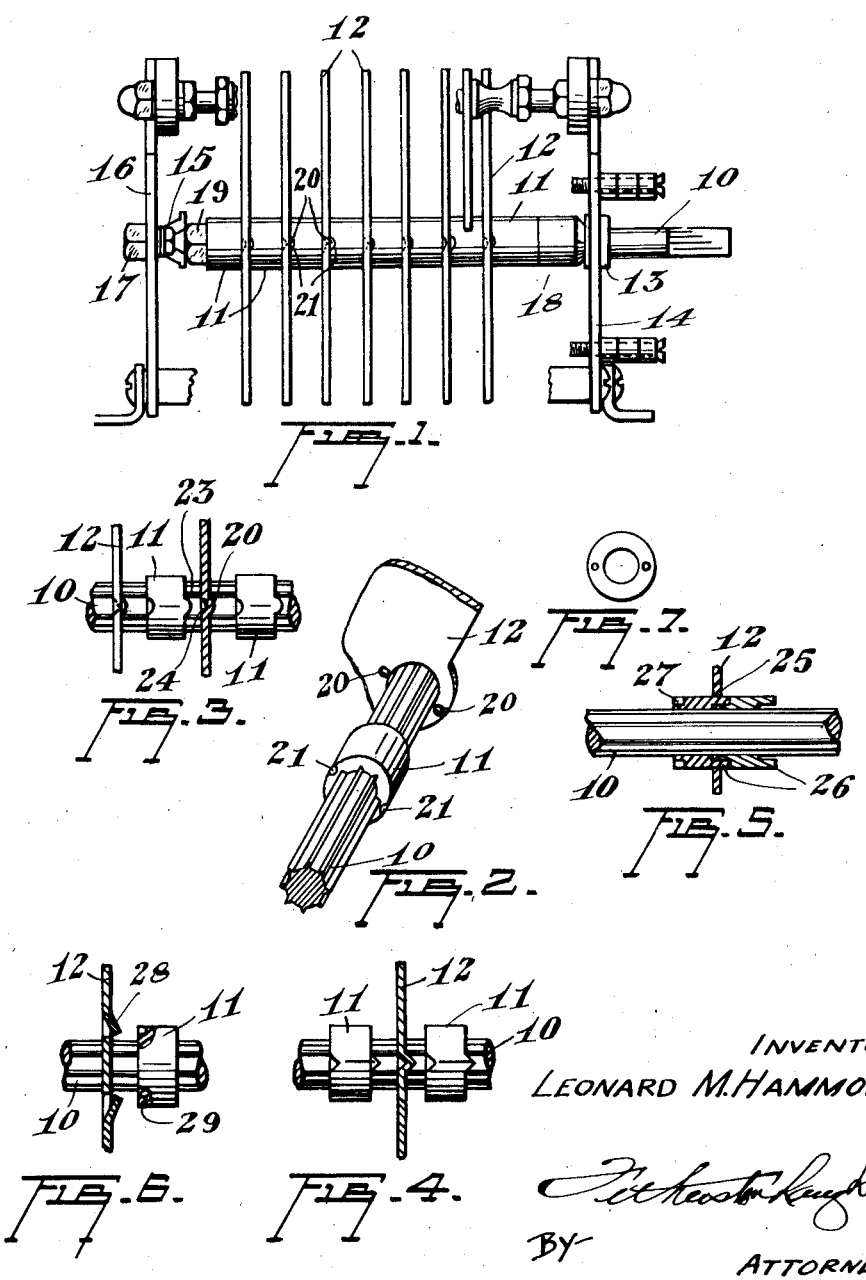
INVENTOR
LEONARD M. HAMMOND
BY
ATTORNEYS.

Patented Feb. 12, 1946

2,394,686

UNITED STATES PATENT OFFICE 2,394,686

VARIABLE CONDENSER

Leonard Malcolm Hammond, Guelph, Ontario, Canada

Application September 10, 1943, Serial No. 501,873

7 Claims. (Cl. 287—52)

This invention relates to variable condensers and is particularly concerned with means for mechanically locking the rotor plates to the shaft. Capacitance in radio receiving and broadcasting and like devices is adjusted by variable condensers which comprise two sets of plates mounted on respective shafts, one set being fixed and the other rotatable so that the rotatable plates are moved into position between the plates of the fixed set. By this means the capacitance is adjusted and it is of the greatest importance that the plates should not turn in relation to their shaft because in most applications the position of the shaft is controlled or set to very fine limits.

The rotor plates are usually separated by spacing washers with a collar at one end of the assembly which is pinned to the shaft and a lock nut at the other end adapted to close up and compress the assembly of plates and spacers. In some cases the plates have been soldered to the shaft and in some cases they have been keyed to it. But it has been usual in the art to leave both the plates and the spacing washers to turn freely on the shaft, prior to tightening of the locking nut, so that the plates are held in position solely by friction on tightening of the lock nut. Thus excessive vibration or any jarring of the device results in movement of one or more plates in relation to the shaft with a consequent change in capacitance so that the reading given by the usual indicator connected to the shaft is false.

This disadvantage is disposed of in the constructions in which the plates are soldered or keyed to the shaft, but these constructions have their own disadvantages. The chief difficulty with soldering the plates with the shaft arises from the fact that the plates are usually made of aluminum which is not easily soldered. For easy soldering the plates must be made of brass, but if they are, counterweighting is required in all but the smallest condensers. Moreover, if soldering is to be the method of fixing the plates to the shaft, both the plates and the shaft must be of the same metal or of metals having substantially the same coefficient of expansion. On the other hand, keying of the plates to the shaft makes it necessary that they be of excessive thickness.

The object of the present invention is therefore to provide in a variable condenser means for mechanically locking the rotor plates to their shaft so that they are held mechanically against movement in relation to their shaft and are not dependent only on friction between spacers and plates held in contact by end collars and lock nuts.

A further object of the invention is to provide a mechanical connection between the rotor plates and their shaft in a variable condenser in which relatively thin plates of soft light metal may be used, but nonetheless there is a relatively great area of contact between the plates and shaft through the intermediary of spacers.

A still further object of the invention is to provide a mechanical connection between the rotor plates and their shaft in a variable condenser such that metals of the same coefficient of expansion need not be used.

According to the invention there is therefore provided in a variable condenser, a shaft, a plurality of spacers adapted to move only longitudinally of the shaft, a plurality of rotor plates freely mounted on the shaft, one between two spacers, means for closing up the plurality of spacers to firmly engage the plurality of plates therebetween, and means providing mechanical engagement between the spacers and the plates comprising at least one projection on at least one face of one component (the plates and the spacers being the two components) and a corresponding recess or hole (hereinafter referred to by the term recess) in the other component adapted to receive such projection in a snug fit.

According to the preferred modification the plates which are of relatively thin metal are deformed to form a projection on one side of the plate and a consequent recess on the opposite side, the projection then fitting into a corresponding recess in the adjacent spacer. Preferably each plate is provided with two such projections and each spacer with two recesses approximately 180° apart, and, if desired, the face of the spacer opposite that having the recesses is provided with two projections which fit into the recesses on the back face of the rotor plate, i. e. the one opposite to the face having the projections. These projections may be round or squared or V-shaped and the recesses may be correspondingly shaped.

In the drawing:

Figure 1 is a side elevation of a variable condenser embodying the preferred modification of the invention, part of the fixed plates of the condenser being cut away.

Figure 2 is a perspective showing the serrated shaft, a spacer and a rotor blade of Figure 1 with the spacer moved away from the rotor blade and the latter broken away.

Figure 3 is a side elevation showing a modification of the invention in which projections are formed on one side of the spacer and recesses are formed on the other side, the serrated shaft being shown broken away, the blades and spacers being separated, and one of the blades being shown in section.

Figure 4 corresponds to Figure 3 and shows a modification in which the projection is V-shaped.

Figure 5 shows a further modification in which the projections are squared and project through a hole in a rotor blade into a corresponding recess in the next spacer, the shaft being shown broken away and the spacer and blade being shown in section.

Figure 6 is a further modification in which the spacers are provided only with recesses, and tongues which engage these recesses are cut and pressed from the rotor plate, the rotor plate and part of the spacer being shown in section, and Figure 7 is an end view of a spacer before it has been forced onto the serrated shaft showing an alternative position for the recesses.

Figure 1 illustrates the usual position of the rotor shaft assembly which consists of shaft 10, spacers 11 and rotor blades 12. At one end the shaft 10 is rotatable in bearing 13 mounted in end plate 14 and at the other end the shaft is carried in pivot bearing 15 mounted in the other end plate 16 and retained in position by means of nut 17. End collar 18 is mounted on shaft 10 next to the bearing 13, and there follows a succession of spacers and rotor plates which are closed up and compressed against the end collar 18 by means of adjusting locknut 19. As shown in Figure 2 the shaft 10 is serrated and the spacers 11 are forced onto it in a tight fit so that they are permitted to move only longitudinally of the shaft. The rotor blades, on the other hand, are not so engaged by the serrations but are provided with projections 20 which extend into recesses 21 formed in one side of the adjacent spacer. Thus when the spacers and rotor blades are closed up, the projections engage the recesses in a snug fit so that the rotor blades 12 cannot rotate in relation to the spacers 11 and thus in relation to the shaft 10.

As shown in Figure 3 each spacer may be provided with projections on the face which is opposite to that having the recesses so that these projections 23 will fit into the recess or depression 24 formed in the back face of a rotor plate when it is pressed to form the projection.

As shown in Figure 4 the projections and recesses may be V-shaped, or as shown in Figure 5 they may be squared.

Figure 5 shows a modification in which holes 25 instead of projections are formed in the rotor blades, and squared tongue-like projections 26 on one face of each spacer extend through the holes 25 and into a corresponding recess 27 on the cooperating face of the following spacer.

Figure 6 shows a further modification in which the spacers are provided only with recesses as in Figures 1 and 2 and the recesses are substantially rectangular as in Figure 5. The rotor blade is then punched, that is, cut and pressed to form tongues 28 adapted to engage in a snug fit in recesses 29.

As shown in Figures 2, 5 and 6 it is convenient to position the recesses so that they open onto the periphery as well as the end face of a spacer. Alternatively, however, they may be formed entirely in the end face as shown in Figure 7.

It is to be understood that this invention is not limited to a variable condenser but includes any electrical device in which it is necessary to provide means for preventing movement of plates in relation to a shaft to which they are mounted.

What I claim as my invention is:

1. In a variable condenser, a shaft carrying a plurality of each of two condenser components, one component being a spacer mounted on the shaft in a tight fit and connected to the shaft to move only longitudinally of it, and the other component being a rotor plate freely mounted on the shaft between two spacers, means for closing up the plurality of components for firm interengagement thereof, and means providing mechanical engagement between the spacers and the plates effective, in combination with the connection between the spacers and the shaft, to prevent relative rotary movement of the rotor plates and the shaft, said means comprising a projection on at least one face of one component and a corresponding recess in the contacting face of the other component adapted to receive such projection in a snug fit.

2. In an adjustable electrical device having a rotatable shaft, a plurality of each of two condenser components carried by said shaft, one component being a spacer mounted on the shaft in a tight fit and connected to the shaft to move only longitudinally of it, and the other component being a rotor plate freely mounted on the shaft between two spacers, means for closing up the plurality of components for firm interengagement thereof, and means providing mechanical engagement between the spacers and the plates effective, in combination with the connection between the spacers and the shaft, to prevent relative rotary movement of the rotor plates and the shaft, said means comprising a projection on at least one face of one component and a corresponding recess in the contacting face of the other component adapted to receive such projection in a snug fit.

3. In a variable condenser, a shaft, a plurality of spacers mounted on the shaft in a tight fit and connected to the shaft to move only longitudinally of it, a plurality of rotor plates freely mounted on the shaft one between two spacers, means for closing up the plurality of spacers to firmly engage the plurality of plates frictionally therebetween, and means providing mechanical engagement between the spacers and the plates effective, in combination with the connection between the spacers and the shaft, to prevent relative rotary movement of the rotor plates and the shaft, said means comprising a projection on one face of each rotor plate and a corresponding recess in the cooperating face of each spacer adapted to receive such projection in a snug fit.

4. An arrangement as defined in claim 3 in which the face of each rotor plate opposite to that carrying said projection has a recess and the cooperating face of each spacer is provided with a projection adapted to engage such recess of the rotor plate in a snug fit.

5. An arrangement as defined in claim 3 in which the projections and recesses are V-shaped.

6. In a variable condenser, a shaft, a plurality of spacers mounted on the shaft in a tight fit and connected to the shaft to move only longitudinally of it, a plurality of rotor plates freely mounted on the shaft one between two spacers, means for closing up the plurality of spacers to firmly engage the plurality of plates frictionally therebetween, and means providing mechanical engagement between the spacers and the plates effective, in combination with the connection between the spacers and the shaft, to prevent relative rotary movement of the rotor plates and the shaft, said means comprising a hole extending through each rotor plate in the portion thereof contacted by a spacer, and a projection formed on one of the spacers contacting each rotor plate and adapted to extend through the hole formed in the adjacent rotor plate and engage said rotor plate in a snug fit.

7. An arrangement as defined in claim 6, in which that face of each spacer which contacts a rotor plate and is opposite to that carrying a projection is provided with a recess adapted to receive the projection of the adjacent spacer after the projection has passed through the hole in the rotor plate engaged between the two spacers.

LEONARD MALCOLM HAMMOND.